US011723433B2

(12) United States Patent
Smith, III

(10) Patent No.: US 11,723,433 B2
(45) Date of Patent: Aug. 15, 2023

(54) INJECTED FOOTWEAR WITH INTERNAL COMPLEX GRAPHIC

(71) Applicant: Roy Robert Smith, III, Sugarland, TX (US)

(72) Inventor: Roy Robert Smith, III, Sugarland, TX (US)

( * ) Notice: Subject to any disclaimer, the term of this patent is extended or adjusted under 35 U.S.C. 154(b) by 0 days.

(21) Appl. No.: 16/690,110

(22) Filed: Nov. 20, 2019

(65) Prior Publication Data

US 2020/0154829 A1 May 21, 2020

Related U.S. Application Data

(60) Provisional application No. 62/770,068, filed on Nov. 20, 2018.

(51) Int. Cl.

| | |
|---|---|
| *A43B 1/00* | (2006.01) |
| *A43B 3/00* | (2022.01) |
| *A43B 3/36* | (2022.01) |
| *A43B 23/02* | (2006.01) |
| *A43B 13/12* | (2006.01) |
| *A43B 23/04* | (2006.01) |
| *B29D 35/06* | (2010.01) |
| *A43B 13/14* | (2006.01) |
| *A43B 1/04* | (2022.01) |

(52) U.S. Cl.
CPC ........ *A43B 23/0235* (2013.01); *A43B 1/0072* (2013.01); *A43B 1/04* (2013.01); *A43B 3/0078* (2013.01); *A43B 13/12* (2013.01); *A43B 13/141* (2013.01); *A43B 23/0215* (2013.01); *A43B 23/042* (2013.01); *B29D 35/061* (2013.01)

(58) Field of Classification Search
CPC ... A43B 1/0027; A43B 1/0072; A43B 3/0036; A43B 3/02; A43B 23/0235; A43B 23/026
See application file for complete search history.

(56) References Cited

U.S. PATENT DOCUMENTS

| | | | | |
|---|---|---|---|---|
| 2,982,033 A | * | 5/1961 | Bingham, Jr. | A43B 1/0027 40/636 |
| 3,319,360 A | * | 5/1967 | Nadler | A43B 23/24 36/4 |
| 3,568,339 A | * | 3/1971 | Hara | A43B 1/0072 36/87 |
| 3,921,313 A | * | 11/1975 | Mahide | A43B 1/0072 36/4 |

(Continued)

*Primary Examiner* — Sharon M Prange
(74) *Attorney, Agent, or Firm* — Gilbreth & Associates, PC; J. M. (Mark) Gllbreth

(57) ABSTRACT

An injected footwear with internal complex graphic is a footwear apparatus that also is an easily manufacturable product. The footwear apparatus includes a sole, an upper, at least one complex graphic, and a sock liner. The sole is below the wearer's foot, while the upper covers the rest of the wearer's foot. The complex graphic integrates an aesthetically pleasing element for the footwear apparatus. The sock liner is used as an intermediate between the wearer's foot and the rest of the footwear apparatus. The complex graphic is internalized in between the sock liner and the upper. The upper and the sole are specifically made of the injectable molding material. A proximal portion of the sock liner is attached to the complex graphic, while the injectable molding material is bonded to a surrounding portion of the sock liner.

19 Claims, 23 Drawing Sheets

(56) References Cited

U.S. PATENT DOCUMENTS

| | | | | |
|---|---|---|---|---|
| 4,096,650 | A * | 6/1978 | Seidel | A43B 1/00 36/118.2 |
| 4,447,967 | A * | 5/1984 | Zaino | A43B 23/0235 36/45 |
| 5,647,150 | A * | 7/1997 | Romanato | A43B 3/0084 12/142 R |
| 8,001,705 | B2 * | 8/2011 | Cagliari | A43B 1/0072 36/117.1 |
| 8,516,724 | B2 * | 8/2013 | Diepenbrock | A43B 1/0072 36/136 |
| 8,555,527 | B2 * | 10/2013 | Koyess | A43B 1/0027 36/45 |
| 8,984,776 | B2 * | 3/2015 | Ludemann | B29D 35/146 36/109 |
| 2004/0114353 | A1 * | 6/2004 | Romeo | A43B 1/0036 362/103 |
| 2005/0223602 | A1 * | 10/2005 | Cagliari | A43B 5/04 36/136 |
| 2012/0129631 | A1 * | 5/2012 | Sullivan | A63B 37/0031 473/373 |
| 2014/0250734 | A1 * | 9/2014 | Zheng | A43B 3/0078 36/136 |
| 2016/0295963 | A1 * | 10/2016 | Chang | A43B 1/0072 |

* cited by examiner

US 11,723,433 B2

INJECTED FOOTWEAR WITH INTERNAL COMPLEX GRAPHIC

The current application claims a priority to the U.S. Provisional Patent application Ser. No. 62/770,068 filed on Nov. 20, 2019.

FIELD OF THE INVENTION

The present invention generally relates to footwear. More specifically, the present invention is an injected footwear with internal complex graphics.

BACKGROUND OF THE INVENTION

Many footwears are produced from an injection molding process. This process is oftentimes simple and only requires a mold. However, the injection molding process does not provide a way to create complex graphics and designs. Therefore, an objective of the present invention to introduce a new and effective method for injected footwear to allow for complex internal graphics.

DETAILED DESCRIPTION OF THE INVENTION

All illustrations of the drawings are for the purpose of describing selected versions of the present invention and are not intended to limit the scope of the present invention.

Figure 4A:
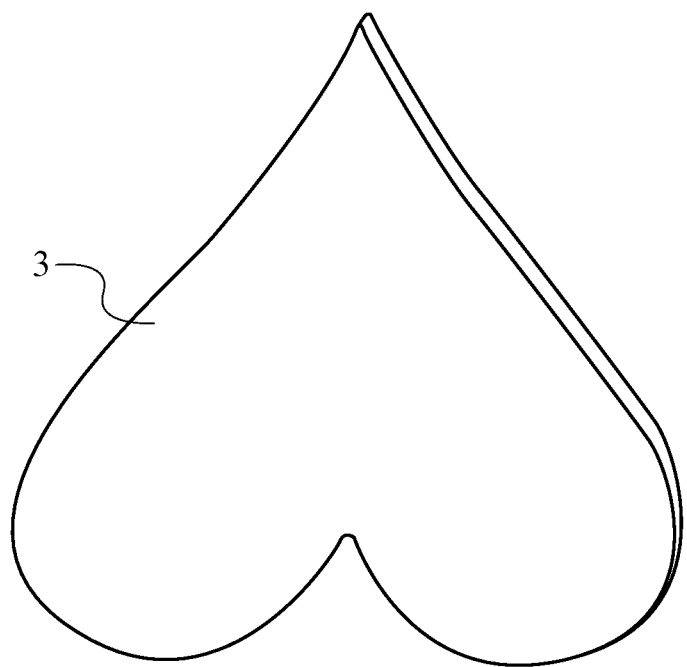
FIG. 4A is an illustration of a complex graphic for the present invention.
Figure 4B:
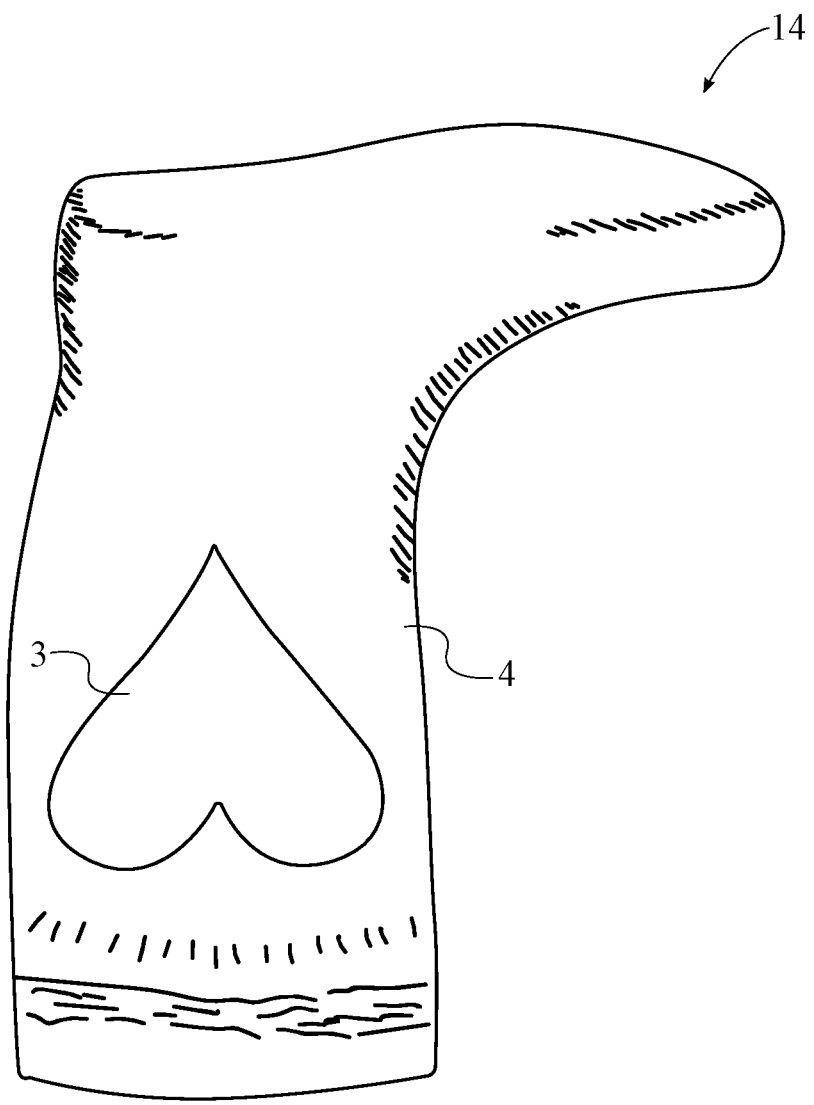
FIG. 4B is an illustration of the last with the sock liner stretched over it, wherein the complex graphic is attached to the sock liner.
Figure 4C:
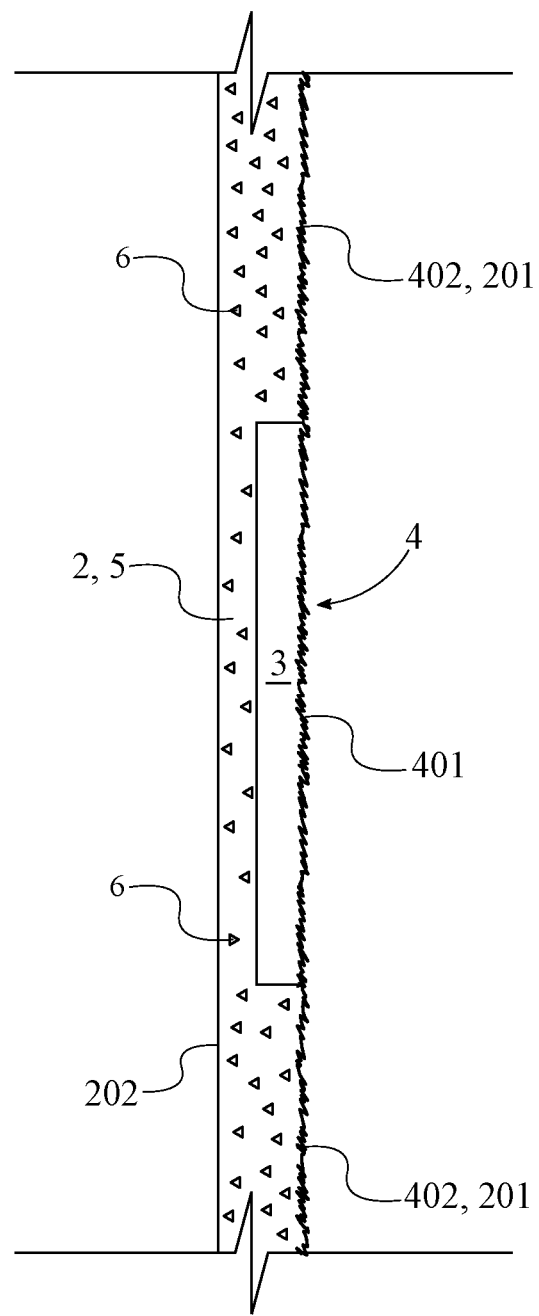
FIG. 4C is a cross-sectional schematic diagram of the connection between an injectable molding material, the complex graphic, and the sock liner.
Figure 5A:
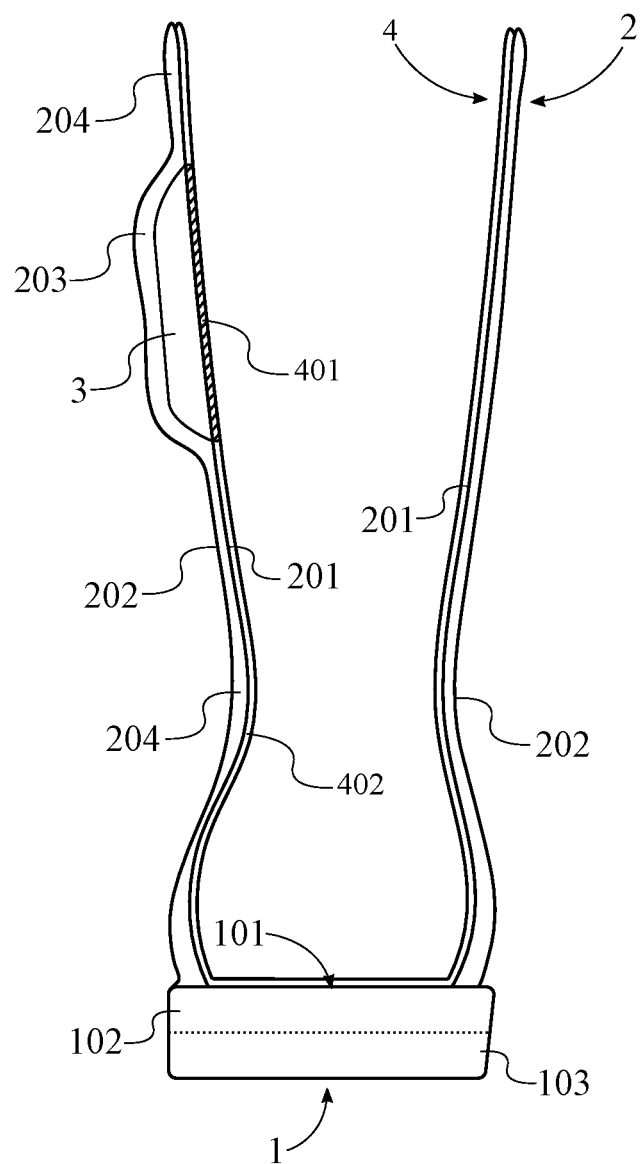
FIG. 5A is a cross-sectional schematic diagram of an upper for the present invention that is using a thicker receiving portion to secure the complex graphic.
Figure 6:
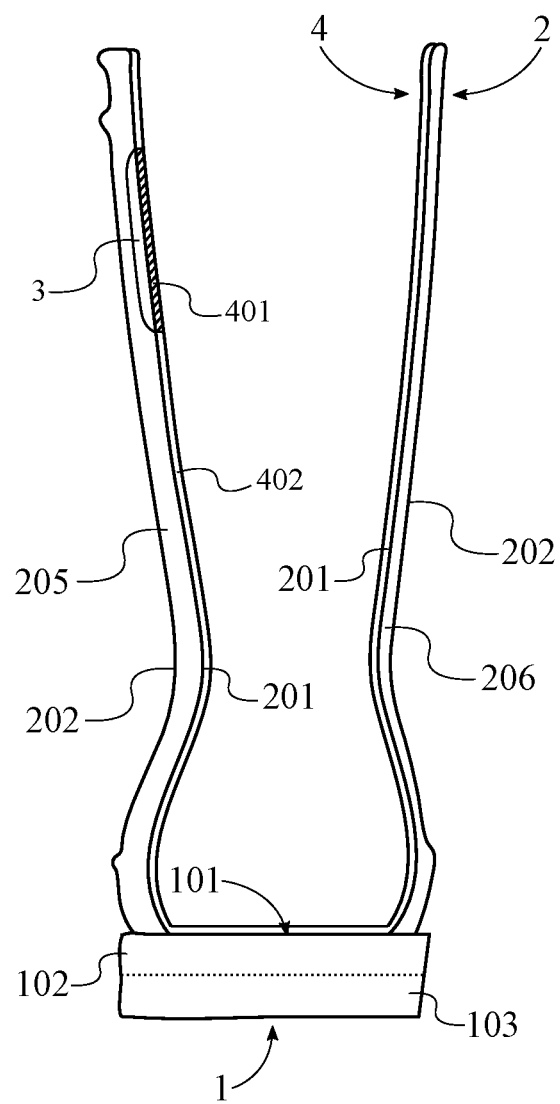
FIG. 6 is a cross-section schematic diagram of the upper for the present invention that is using a thicker lateral portion on one side.

As can be seen in FIGS. 4C, 5A and 6, the present invention is an injected footwear with internal complex graphic 3 and is an advancement in the art of injected footwear. A preferred embodiment of the present invention comprises a sole 1, an upper 2, at least one complex graphic 3, and a sock liner 4. The sole 1 is the part of the injected footwear that is situated below a wearer's foot, while the upper 2 is the part of the injected footwear that is situated over the wearer's foot. The at least one complex graphic 3 is used to add an aesthetically pleasing element to the upper 2 of the present invention. The sock liner 4 is used as an interface between the injected footwear and the wearer's skin.

The configuration of the aforementioned components allows the present invention to be an easily manufacturable product with an internalized aesthetically pleasing element. The upper 2 is connected onto to the sole 1 in order to form an enclosing body for the injected footwear. The upper 2 may also comprise an interior surface 201 and an exterior surface 202, which are used to reference where other components may be positioned on the present invention. In addition, the sole 1 may comprise an insole 101, a midsole 102, and an outsole 103, which are similarly used to reference where other components may be positioned on the present invention. Thus, the complex graphic 3 traverses into the upper 2 from the interior surface 201 in order to firmly secure the complex graphic 3 onto the injected footwear. Moreover, the sock liner 4 may comprise a proximal liner portion 401 and a surrounding liner portion 402. The proximal liner portion 401 is a defined section of the sock liner 4 that is positioned adjacent the complex graphic 3, and, consequently, the complex graphic 3 is connected in between the upper 2 and the proximal liner portion 401. The surrounding liner portion 402 is another defined section of the sock liner 4 that is positioned around the proximal liner portion 401 so that the surrounding liner portion 402 is connected onto the interior surface 201 and the insole 101. This allows the sock liner 4 to prevent direct contact between the wearer's foot and the injected footwear, and, consequently, the wearer's foot may not experience chafing from the injected footwear. In addition, the complex graphic 3 is internalized between the upper 2 and the sock liner 4 and embellishes the upper 2 so that the complex graphic 3 is positioned to be easily visible on the present invention. The sole 1 and the upper 2 are made of an injectable molding material 5, which allows the present invention to be an easily manufacturable product. The injectable molding material 5 is preferably polyvinyl chloride (PVC). The injectable molding material 5 is bonded into the surrounding liner portion 402, which consequently allows the surrounding liner portion 402 of the sock liner 4 not to be attached to the complex graphic 3.

Figure 1:
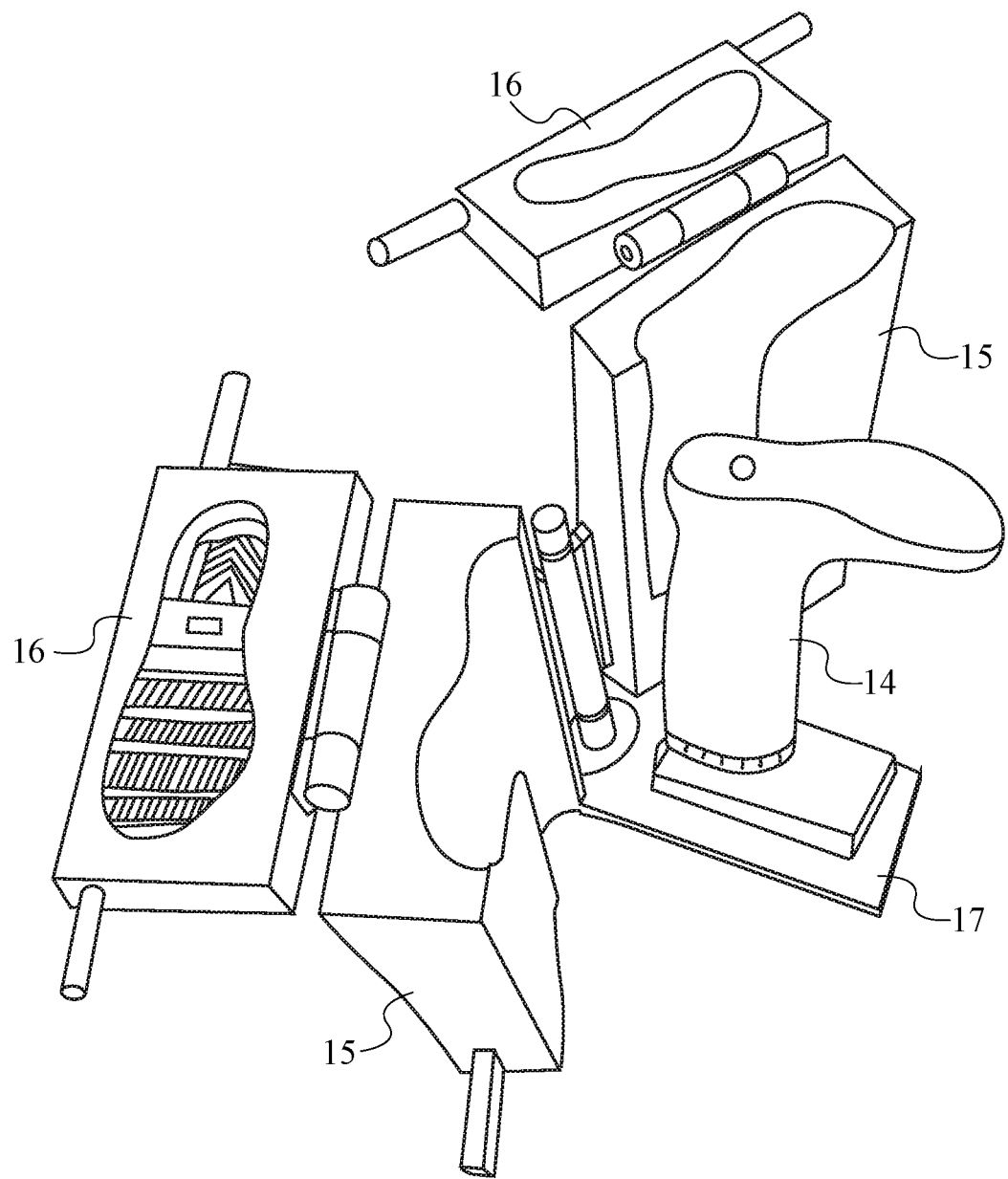
FIG. 1 is an illustration of an injection mold used to manufacture the present invention.

As can be seen in FIG. 1, the process for manufacturing the injected footwear requires a mold with multiple components, which includes, but are not limited to, a last 14 and other mold components that surround the last 14. The other mold components may be connected to a portion of a base 17 of the mold by hinges and/or to each other by way of hinges, which allows the other mold components to wrap around the last 14, thus encapsulating the last 14 during the injection process. The last 14 itself may be directly connected to the base 17 of the mold, while the base 17 itself may be directly connected to an injection machine. Moreover, the last 14 forms the shape and size of the cavity (i.e. the internal void of the injected footwear), which accommodates a person's foot and ultimately determines the product's fit and comfort. If the injected footwear is a boot, then the last 14 also forms the same internal void for the boot shaft, even if the injected footwear is a short booty or a boot, whereby the boot shaft fits just below a person's knee.

With the last 14 forming the internal void of the injected footwear, it is the balance of the other mold components which ultimately form the final injected product. While encapsulating the last 14, the other mold components completely form the upper 2, the insole 101, the midsole 102, and the outsole 103 of the final injected product. The final injected product may also contain any tread pattern as well as any boot shaft. Ultimately, the other mold components and their encapsulation of the last 14 forms the styling and the outward fashion of the final injected product. The primary mold components 15, which form the upper 2, are closed around the last 14, thus encasing the last 14 in a clam shell manner, while leaving the bottom of the last 14 (i.e. the sole-forming area of the last 14) exposed. The last 14 is positioned with its bottom facing upwards (i.e. upside down) and with its top facing downwards and connecting to the base 17 of the mold. The primary mold components 15, which form the upper 2 by encasing the last 14, are mounted on hinges so that the hinges themselves are connected to a portion or mounting arm of the base 17 of the mold. From the primary mold components 15, one primary mold component forms the upper 2 from the heel of the last 14 to the toe, on the shank side or "arch" side of the last 14, while another primary mold component forms the upper 2 on the opposite side of the last 14, which may be referred to as the outside of the last 14. In the case of a boot, each primary mold component 15 would form its portion of the boot shaft and respective portion of the upper 2. Once again, these two primary mold components 15 leave exposed the bottom of the last 14 which is upward facing, but these two remaining mold components 16 do in fact close the top of the last 14, which is downward facing and connected to the base 17 of the mold. When closed around the last 14, the primary mold components 15 simply contact the last 14 in order to form the top line of the injected footwear and/or top line of the boot shaft during the injection molding process.

Figure 2:
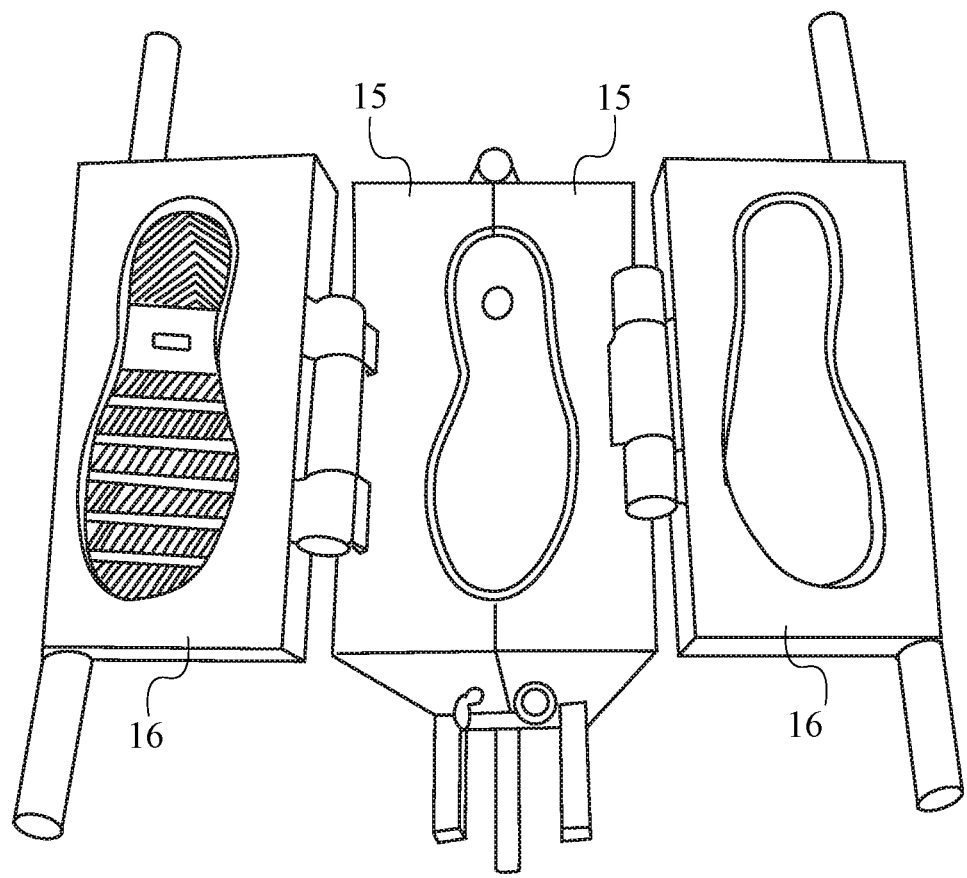
FIG. 2 is an illustration of the injection mold transitioning from a first injection process to a second injection process in order to manufacture the present invention.
Figure 16:
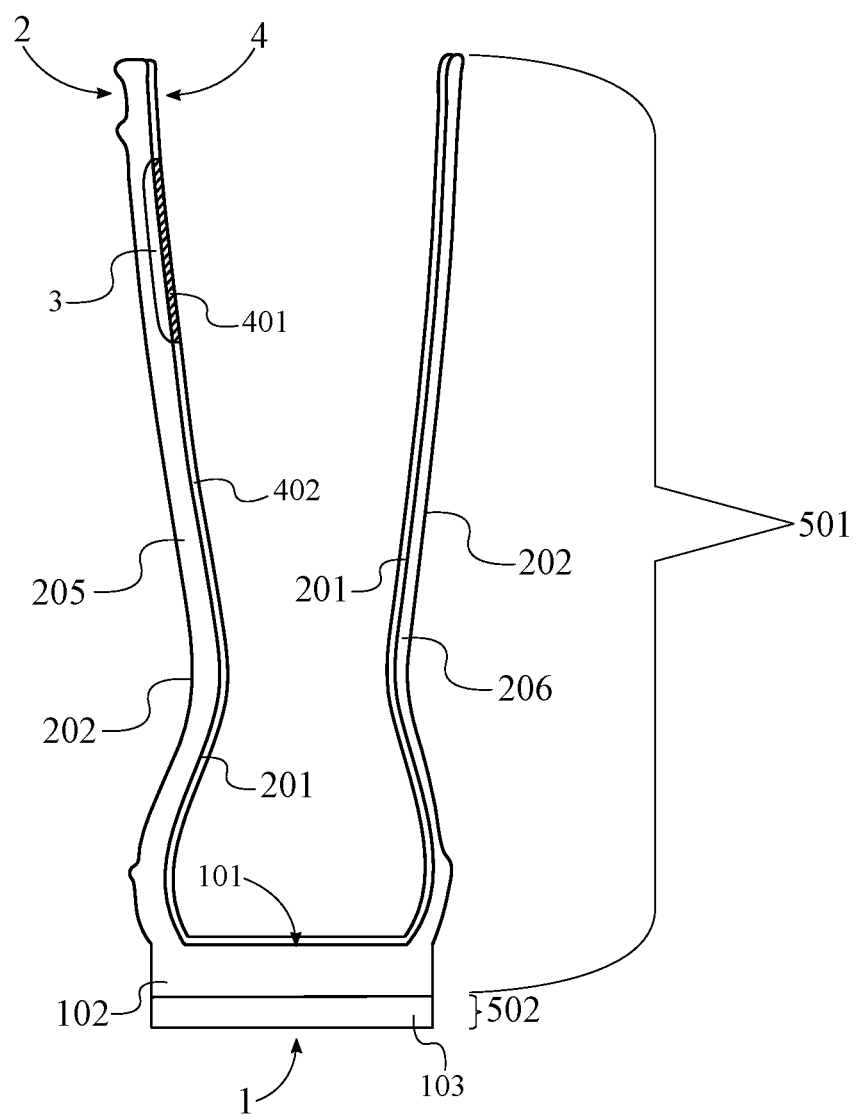
FIG. 16 is a cross-sectional schematic diagram showing which portions of the upper and the sole are made during the first injection process or the second injection process.

As can be seen in FIG. 2, with the two primary mold components 15 now closed around the last 14 leaving exposed the bottom of the mold, one of two remaining mold components 16 are used to fully encase the last 14. One of these remaining mold components 16 is used to form the insole 101 and a portion of the midsole 102, while the other remaining mold component 16 is used to form the insole 101 and the entirety of the outsole 103, which includes any remaining area of the midsole 102 and a tread pattern. Thus, the upper 2, the insole 101, and the midsole 102 are made of a first-step portion 501 of the injectable molding material 5, and the outsole 103 and any remaining balance of the midsole 102 is made of a second-step portion 502 of the injectable molding material 5, which is shown in FIG. 16. The first-step portion 501 and the second-step portion 502 are sequentially separated portions of the injectable molding material 5, which allows for the execution of a two-step injection molding process for the final injected product.

For example, if injection molding a boot, then the manufacturer may choose to use that a mold component 16 which only forms the insole 101 and a portion of the midsole 102, and, consequently, the first injection process would form the upper 2, the insole 101, and the portion of the midsole 102. Once the first injection process is complete, then the mold component 16 used to form the insole 101, which is connected by a hinge to one of the two primary mold components, is simply removed. This allows the final mold component to be set in place to form the final outsole 103 comprising the balance of the midsole 102 and tread pattern, which completes a two-step injection process. As with the mold component for the insole 101 and the midsole 102, the mold component 16 for the outsole 103 is also connected by a hinge to the opposite primary mold component 15.

Figure 3A:
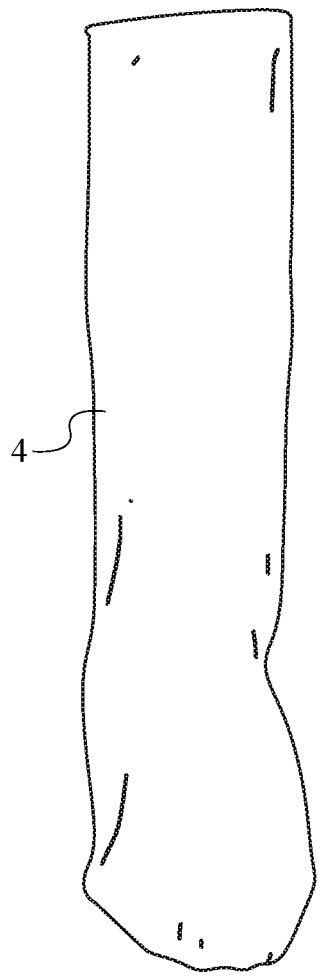
FIG. 3A is an illustration of a sock liner for the present invention before the sock liner has been installed or applied over a last.
Figure 3B:
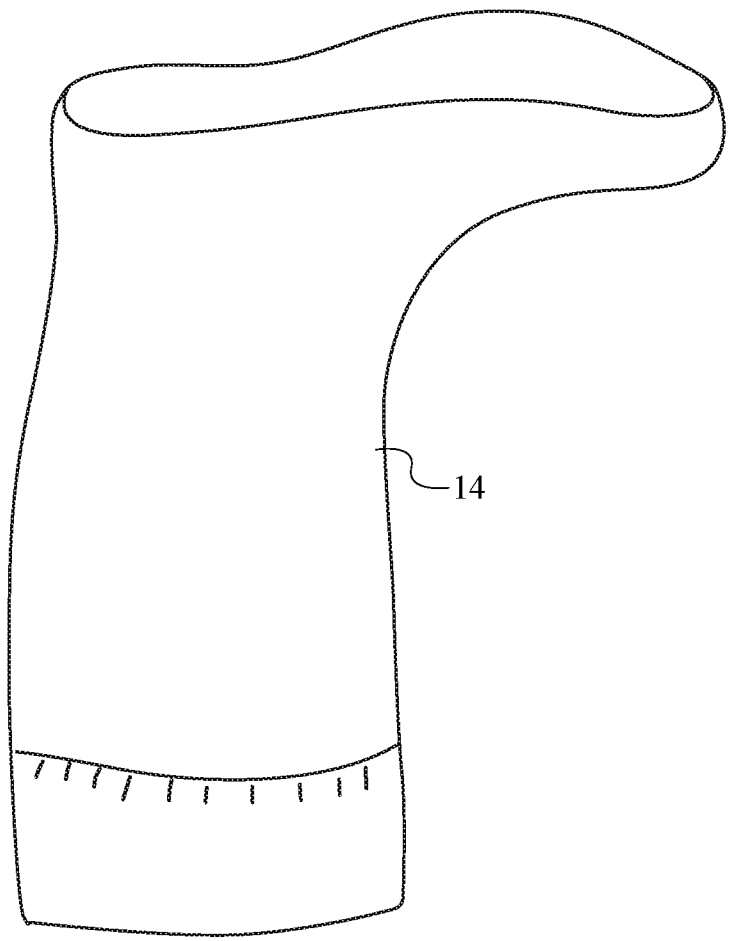
FIG. 3B is an illustration of the last without the sock liner stretched over it.
Figure 3C:
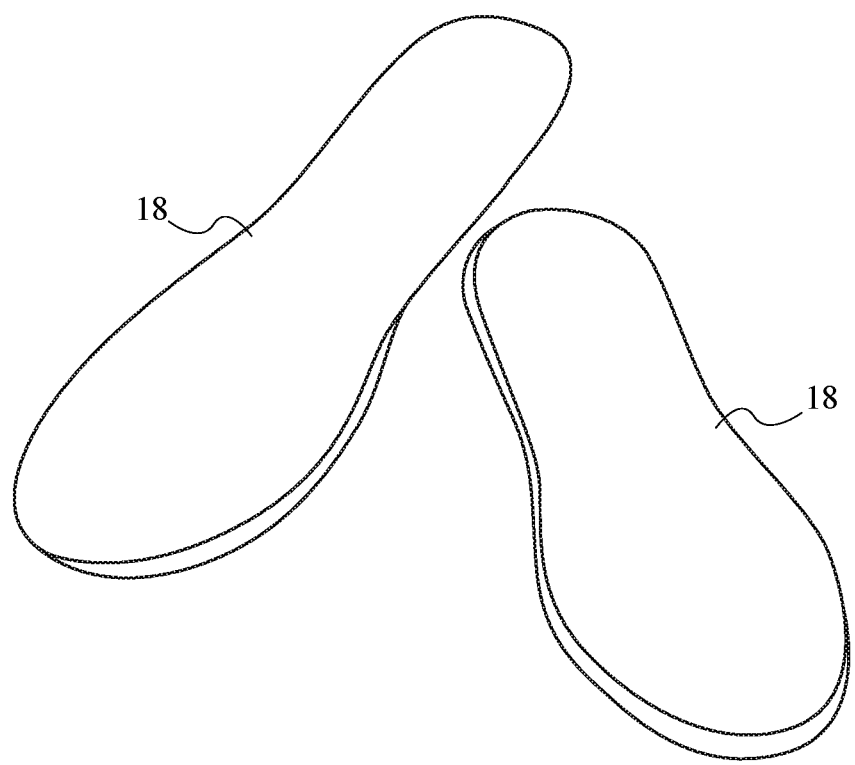
FIG. 3C is an illustration of a padded sock liner or a padded sock.
Figure 3D:
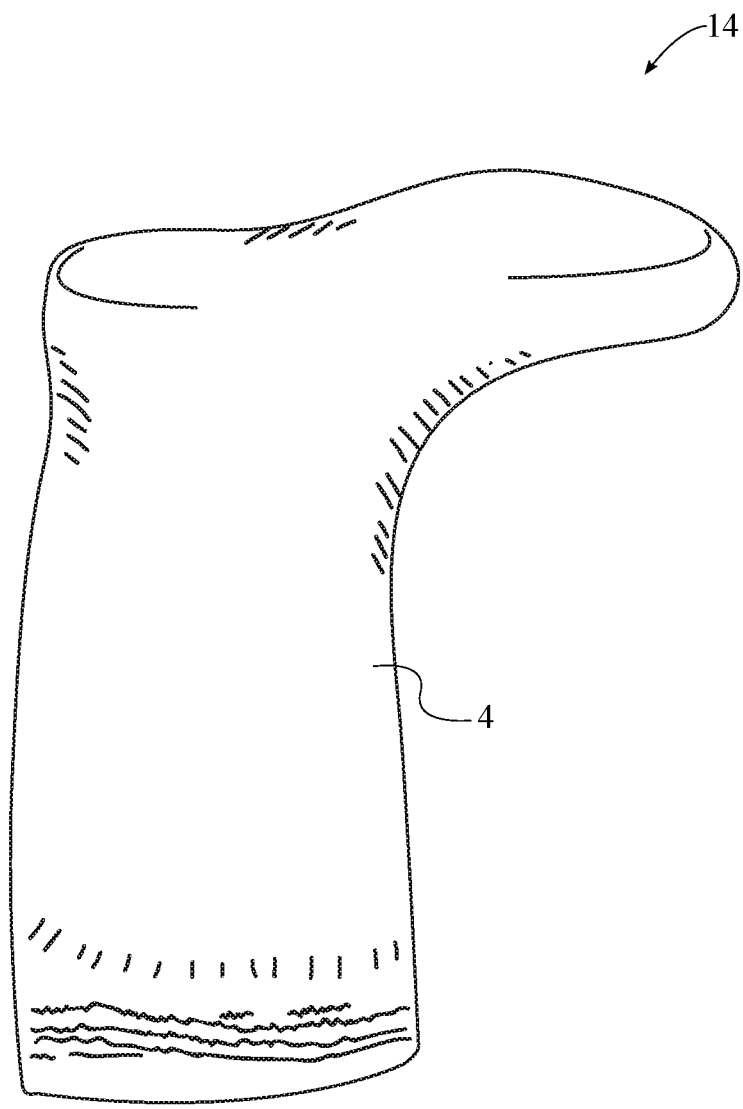
FIG. 3D is an illustration of the last with the sock liner stretched over it.

It is also possible for a manufacturer to forgo a two-step injection process by skipping the prior formation of the insole 101 and simply encapsulate the last 14 with the mold component which forms the complete sole 1, which employs a single injection process. Ultimately, a thickness of the upper 2 and/or boot shaft of the injected product is within a range measuring approximately 2.0 millimeters in thickness, whereby the outsole 103 will vary in its overall design and form and a padded sock 18 may be applied over the insole 101 to add comfort to the foot, which can be seen in FIG. 3C.

Separate from the basic injection process, a manufacturer has several options so to embellish injected product. Using a boot once more as an example, the manufacturer may use PVC in various colors, which can be translucent or generally opaque. In addition, the present invention may also allow for a transparency property of the injectable molding material 5 to be, clear, translucent, partially opaque, or opaque.

As can be seen in FIGS. 3A, 3B, 3C, and 3D, the sock liner 4 may be applied over the last 14 prior to the injection molding process, which may be of various colors or printed patterns. Though sock liners of various colors and prints are generally used with clear PVC in order to create an injected product of a more fashionable nature, sock liners are often used with various colors of PVC which may add comfort and assist with taking the product on and off the foot. No matter the purpose of a sock liner 4, the material used to make the sock liner 4 in the production of injected footwear is of a very low thread count, and, consequently, the sock liner 4 is generally sheer once pulled and stretched over the last 14. The low thread count in the sock liner 4 allows the PVC to penetrate through the sock liner 4 and contact the last 14, thus bonding the sock liner 4 with the PVC. More specifically, the sock liner 4 may be made of a low thread count fabric, which allows the injectable molding material 5 to traverse into an interspacing of the low thread count fabric and consequently allows the injectable molding material 5 to securely bond with the interior surface 201 of the upper 2 and the insole 101. If the last 14 is non-textured, then a sock liner 4 may be required to successfully remove the finished boot product from the last 14, while being assisted by air pressure. The last 14 for a boot generally incorporates a valve on the bottom of the last 14, which is the area where the insole 101 is formed. This valve is much like any valve in a combustion engine in both its design and function. When closed, the valve head forms a smooth surface in helping to form the insole 101 during the injection molding process. When the boot is completed, and air pressure applied, the valve opens forcing air within the final injected product, thus helping to separate the final injected product from the last 14. Made possible by the sock liner 4 and air pressure, the final injected product is then pulled from heel to toe off of the last 14, much like a boot being removed from a foot.

Alternatively, a last 14 may contain a texture, generally a fine grid pattern, whereby a manufacturer can produce the final injected product as a boot while not incorporating a sock liner 4. The fine grid pattern incorporated on the surface of the last 14, combined with the injection of air between the last 14 and the final injected product, allows for the removal of the final injected product from the last 14. The term "sock liner" may also be defined and understood to be the upper lining or sock and should not be confused by a the padded sock 18 (FIG. 3C) or a padded sock liner, which may be applied on top of the insole 101 for the injected footwear. Though the term "sock liner" may be used in the art to describe both the sock liner 4 for the upper 2 and the padded sock 18 is placed over the insole 101 to add comfort for the bottom of the foot. The term "sock liner" as used in the art may in fact be used so to describe these two different elements and/or components of footwear.

As can be seen in FIGS. 4A, 4B, and 4C, in the preferred embodiment of the present invention, the complex graphic 3 is used to add fashion, embellishment, and ornamentation to the upper 2 of the injected footwear. The complex graphic 3 may include, but is not limited to: multi-dimensional, high definition, digitally-printed graphics on various substrates and materials; three-dimensional objects; three-dimensional puffy stickers; stickers; metal; metal with enamel coatings; acrylic or resin ornamentation; ornamentation containing glitter or other decorative elements suspended or floating within liquid; embroidered patches; and elements of interactive play.

More specifically, the complex graphic 3 may be applied to the sock liner 4 by adhesive or other suitable means, with the sock liner 4 first being applied to the last 14. (FIGS. 4A, 3A, 3B, 3D, and 4B) With the complex graphic 3 applied and firmly attached to the sock liner 4, also referred to as the sock, the mold components may be closed encapsulating the last 14 while commencing with the injection molding process. The complex graphic 3 and separately its attachment to the sock liner 4 must withstand both the heat of the molten PVC and/or other injected materials as well as the pressures created during the injection molding process. Therefore, an internal complex graphic 3 may be any element or combination of elements, which are capable of withstanding the high temperatures and pressures in which they are exposed to during the injection molding process. Upon completion of the injection molding process, the complex graphic 3 is internalized, positioned between the sock liner 4 and the exterior surface 202, within the upper 2 and or boot shaft of the injected footwear. Additionally, this internalization of the complex graphic 3 by the exterior surface 202, provides protection to the complex graphic 3 so that the complex graphic 3 is not damaged during the normal use, wear, and tear of the final injected product. The internalization of the complex graphic 3 may provide the complex graphic 3 with the visual effect of distortion, magnification, and etc. when viewed by an observer.

The complex graphic 3 may be secured within the injected footwear by a thicker designated section of the injected footwear. The upper 2 may further comprise a receiving portion 203 and a remainder portion 204. The receiving portion 203 is used to secure the complex graphic 3, while the remainder portion 204 is the portion of the upper 2 that is not the receiving portion 203. Thus, the complex graphic 3 traverses into the receiving portion 203 from the interior surface 201, which positions a peripheral boundary of the receiving portion 203 around a peripheral boundary of the complex graphic 3. Moreover, a thickness of the receiving portion 203 is greater than a thickness of the remainder portion 204, which allows the receiving portion 203 to receive a larger sized complex graphic 3 than what is regularly possible with the upper 2 having a regular thickness.

Figure 5B:
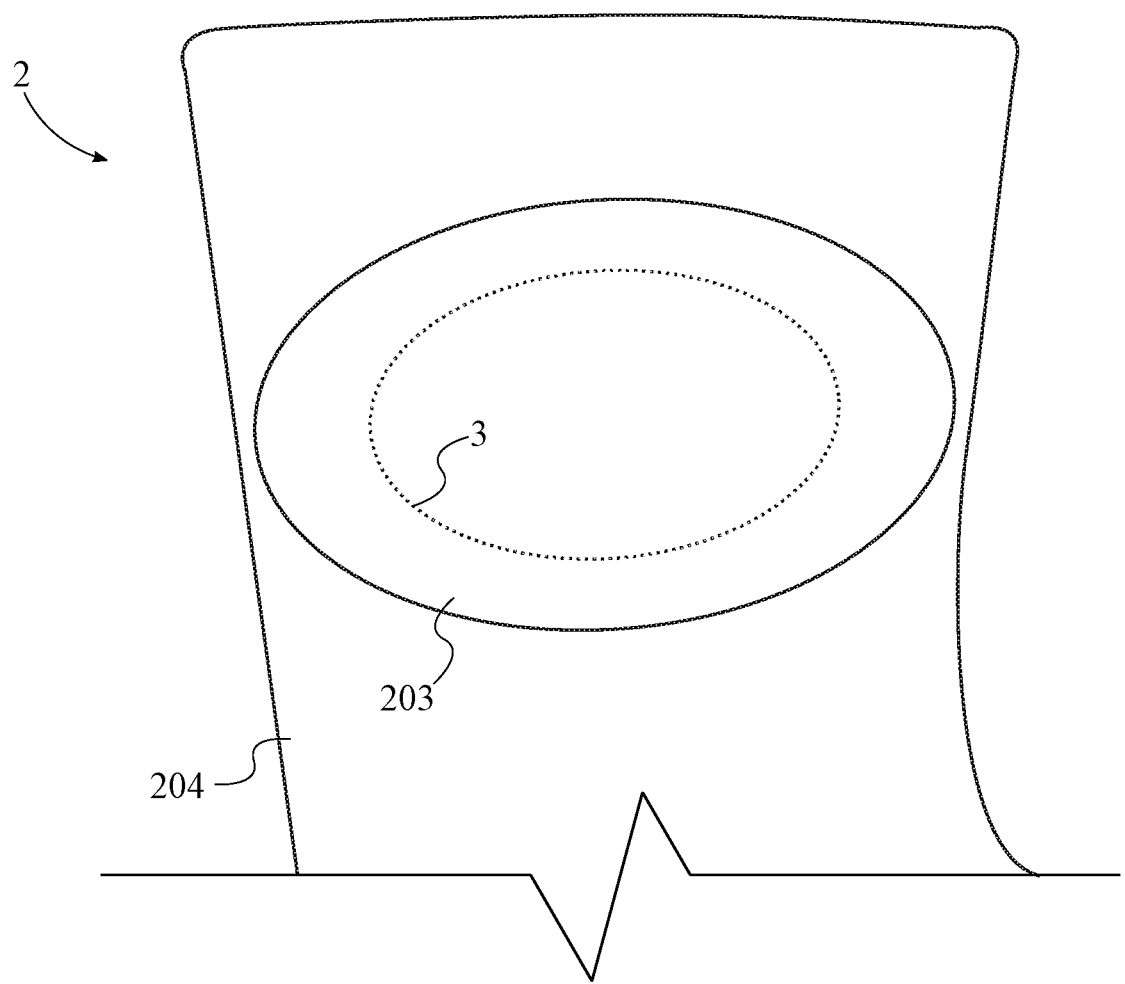
FIG. 5B is a side schematic diagram of the upper for the present invention that is using a thicker receiving portion to secure the complex graphic.

More specifically, as can be seen in FIGS. 5A and 5B given that a standard upper or boot shaft of the injected footwear is generally no thicker than 2.0 millimeters, the standard upper or boot shaft of the injected footwear may limit many types of an internal complex graphic 3, which otherwise may be internalized within the upper 2. In order to expand the overall size and use of the complex graphic 3, areas of an upper 2 or boot shaft which may be used to internalize the complex graphic 3 can simply be increased from a standard thickness to a thicknesses that would allow for larger and/or thicker complex graphics 3 to be internalized within the upper 2 or the boot shaft. For example, a boot mold may be designed to incorporate an area of the boot shaft to transition from a thickness of 2.0 millimeters to a thickness of 4 or 5 millimeters or more. In addition, the upper 2 may be configured to form a thicker, raised area on the boot shaft, which a manufacturer can embellish with an internal complex graphic 3. This raised or bubble type configuration may provide more magnification or distortion of the complex graphic 3 and/or the sock liner 4.

Alternatively, the complex graphic 3 may be secured within the injected footwear by a thicker undesignated section of the injected footwear. The upper 2 may further comprise a first lateral portion 205 and a second lateral portion 206, which are positioned opposite to each other about the upper 2. The complex graphic 3 traverses into the first lateral portion 205 from the interior surface 201 because a thickness of the first lateral portion 206 is greater than a thickness of the second lateral portion 206. Consequently, the first lateral portion 206 is better suited to integrate multiple, larger, and/or thicker complex graphics 3. More specifically, as can be seen FIG. 6, in addition to this raised or bubble type configuration, a boot mold could be designed whereby the boot shaft, opposite that side of the boot containing the shank side or arch, may be largely increased in thickness from the base 17 of the upper 2 or the boot shaft at the outsole 103, up to and including the top of the boot shaft (i.e. the topline of the boot shaft). This creates an injected boot product which may incorporate an overall larger area which may accommodate a larger variety of complex graphics 3 that are internalized within the upper 2 or boot shaft of the injected footwear.

In an alternative embodiment, an internal complex graphic 3 may be attached by adhesive or other suitable means directly to the last 14, with the last 14 comprising a texture that is generally a small grid pattern, which allows for the production of final injected product without the use of a sock liner 4. When the complex graphic 3 is directly attached to the last 14, the complex graphic 3 must be able to withstand the heat of the molten PVC as well as the pressures of the injection molding process. The complex graphic 3 may be configured so that the adhesive backing of the complex graphic 3 releases from the last 14 or alternatively releases from the complex graphic 3 itself in order to avoid an adhesive surface remaining within the interior of the boot shaft.

Figure 7:
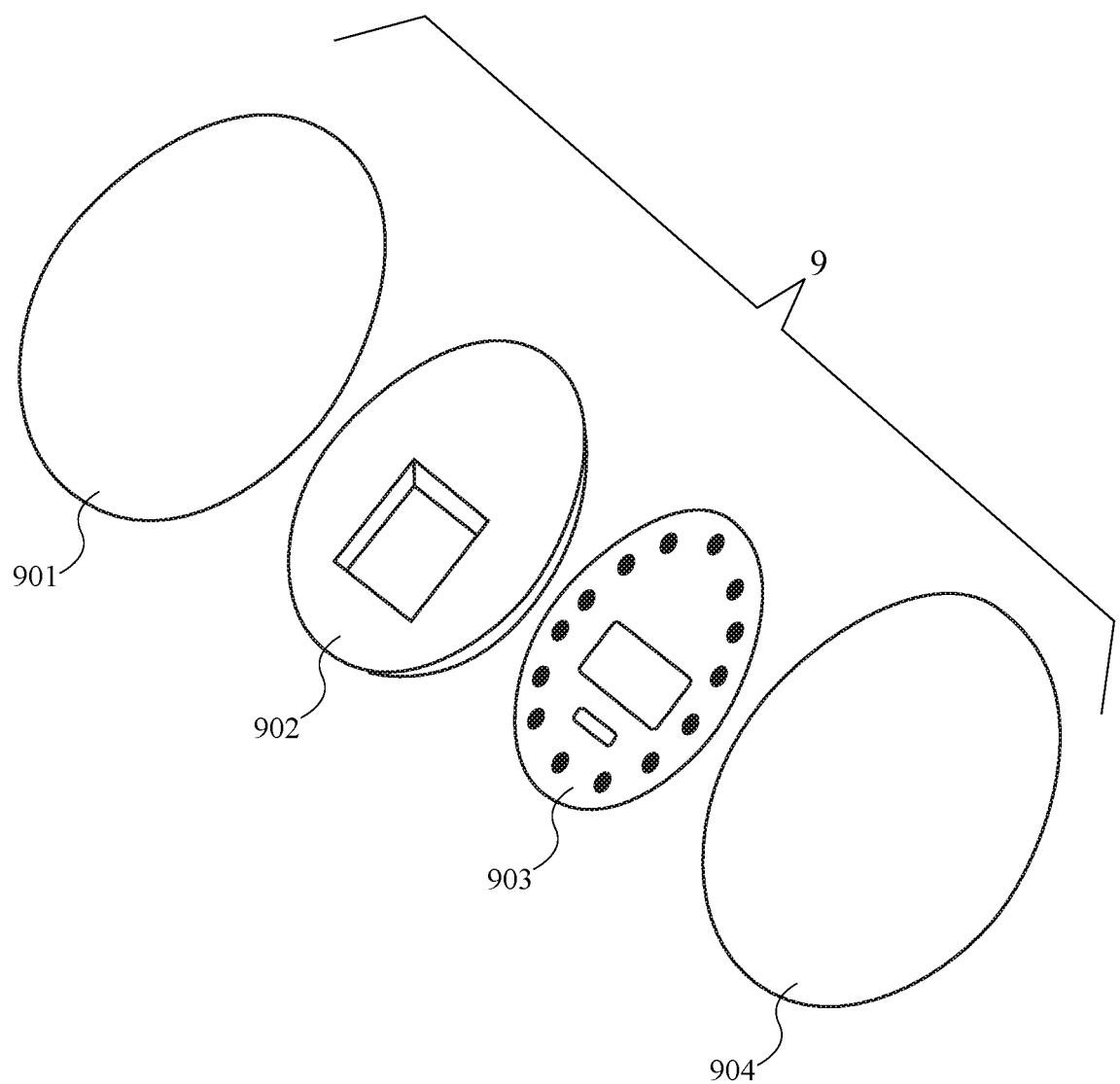
FIG. 7 is an illustration of the internal components of an LED device for the present invention.

As can be seen in FIG. 7, the complex graphic 3 may be illuminated from an adjacent source on the injected footwear in order to further accentuate the visibility of complex graphic 3 on the injected footwear. Thus, the present invention may further comprise at least one light emitting diode (LED) device, which is used for illumination. The LED device 9 is connected into the upper 2 in order to firmly secure the LED device 9 onto the injected footwear. The LED device 9 is also configured to illuminate the complex graphic 3 so that the complex graphic 3 is clearly visible with the supplemental light provided by the LED device 9.

More specifically, an internal complex graphic 3 may comprise a LED device 9, or a complex graphic 3 may contain an LED device 9, internally within the complex graphic 3. Both the complex graphic 3 comprising an LED device 9 and the complex graphic 3 containing an LED device 9 may contain the entire LED component 903 (i.e. its integrated circuit, switch, battery(s), wires, LED lights, and etc.) within the upper 2 or boot shaft of the final injected product. Therefore, no element of the LED device 9 is located within the sole 1, or heel area of the sole 1 or outsole 103. The LED device 9 may be positioned within or behind the complex graphic 3, or alternatively, in some manner exposed on the edges or the surface, or protruding through the surface, or extending from of the complex graphic 3. The complex graphic 3 is once again applied to the sock liner 4 or directly to the last 14 with adhesive or other suitable attachment means, prior to the injection of the injectable molding material 5.

In some embodiments, the complex graphic 3 may internally contain the entirety of the LED device 9. This complex graphic 3 with an internal LED device 9 comprises a clear or translucent front surface component 901 and a backing 904. Located between the front surface component 901 and the backing 904 is the LED component 903 containing lights sources, battery, switch, integrated circuit, and etc. The front surface component 901 and backing 904 are joined with the LED component 903 positioned between the front surface component 901 and backing 904. When the light sources of the LED device 9 are activated, light passes through the clear or translucent front surface component 901, which may contain a clear, translucent, or opaque graphical art, whereby light may also pass through such a clear or translucent graphical art. In these embodiments, the complex graphic 3 results in an internally illuminated complex graphic 3. Alternatively, spacers or padding 902 may be used to compensate for an LED device 9 which contains areas of bulk, such as a battery, which is able to eliminate what may otherwise be empty voids within the complex graphic 3 and/or to diffuse light.

Figure 8:
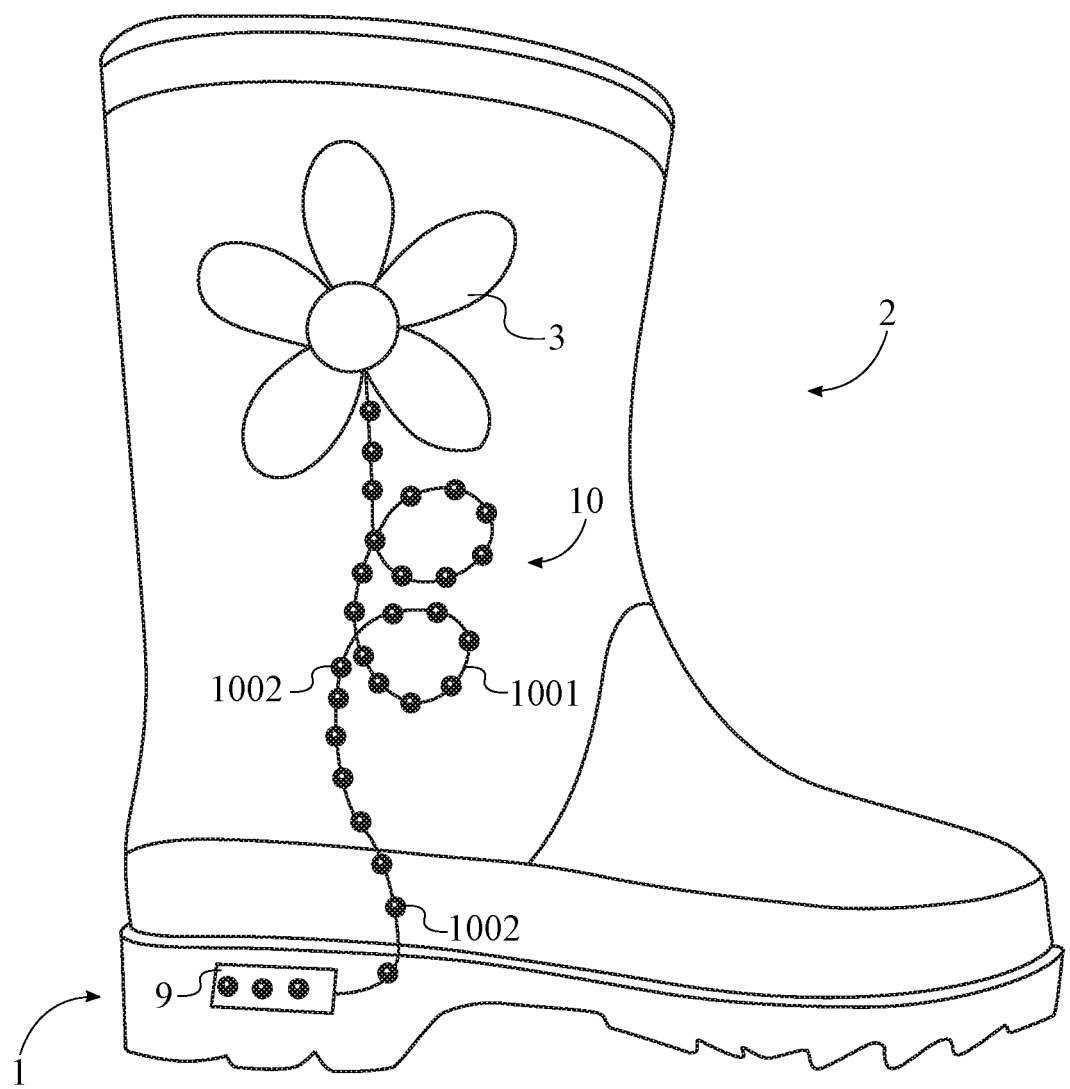
FIG. 8 is a side view of the present invention, wherein the present invention is using a string of LEDs following a decorative path between the complex graphic and the LED device.

As can be seen in FIG. 8, the complex graphic 3 may alternatively be accompanied by and/or illuminated by an offset source within the injected footwear in order to similarly accentuate the visibility of complex graphic 3 on the injected footwear. Thus, the present invention may further comprise at least one LED device 9 and at least one string of LEDs 10, which are both used for illumination. The LED device 9 is connected into the sole 1, which allows the light from the LED device 9 to radiate throughout the sole 1 and the upper 2. The string of LEDs 10 traverses out of the LED device 9 and is positioned in between the upper 2 and the sock liner 4 in order to create a decorative illuminated path through the injected footwear. The string of LEDs 10 is also electrically connected to the LED device 9 so that the string of LEDs 10 is powered by the LED device 9 and is functionally coordinated with the LED device 9. The string of LEDs 10 may traverse to the complex graphic 3 as a way to complete an aesthetic link between the LED device 9 and the complex graphic 3. The string of LEDs 10 may also traverse through the sole 1 and about the upper 2 in order to illuminate a sizable portion of the injected footwear.

More specifically, the LED light sources and their wires internally within the upper 2 and/or boot shaft of injected footwear, while the LED device 9 itself is located within the outsole 103, typically the heel area. With the LED device 9 located in the outsole 103, wires connecting the LED device 9 to the LED light sources extend from the LED device 9, up and into the upper 2 or boot shaft of the final injected product. In this embodiment, the electric wires, the LED light sources, the optional light diffusers, sleeves 11, and/or other elements may be attached to the sock liner 4 or may be directly attached onto the last 14 prior to the injection molding process, which internalizes these components within the upper 2 or boot shaft of the final injected product. This embodiment may not require that an upper 2 or boot shaft be thicker than 2.0 mm, but a thicker upper 2 or boot shaft may be used for any embodiment.

In addition, the string of LEDs 10 may comprise a decorative wire 1001 and a plurality of LEDs 1002. The decorative wire 1001 is used to visually enhance the area surrounding the complex graphic 3, while the plurality of LEDs 1002 is used to illuminate the aesthetic features of the decorative wire 1001. The plurality of LEDs 1002 is positioned along the decorative wire 1001 so that the entire length of the decorative wire 1001 is illuminated by the plurality of LEDs 1002. In addition, the plurality of LEDs 1002 is electrically connected to the decorative wire 1001, which allows the LED device 9 to distribute power amongst the plurality of LEDs 1002. More specifically, LEDs are available in extremely small sizes and may be connected to flat wires or decorative wiring, which too may share a very small profile. Combining this embodiment with the complex graphic 3 can create additional visual effects, whereby the complex graphic 3 may reflect and/or refract light so that this reflection and refraction may create yet additional visual effects.

Figure 9:
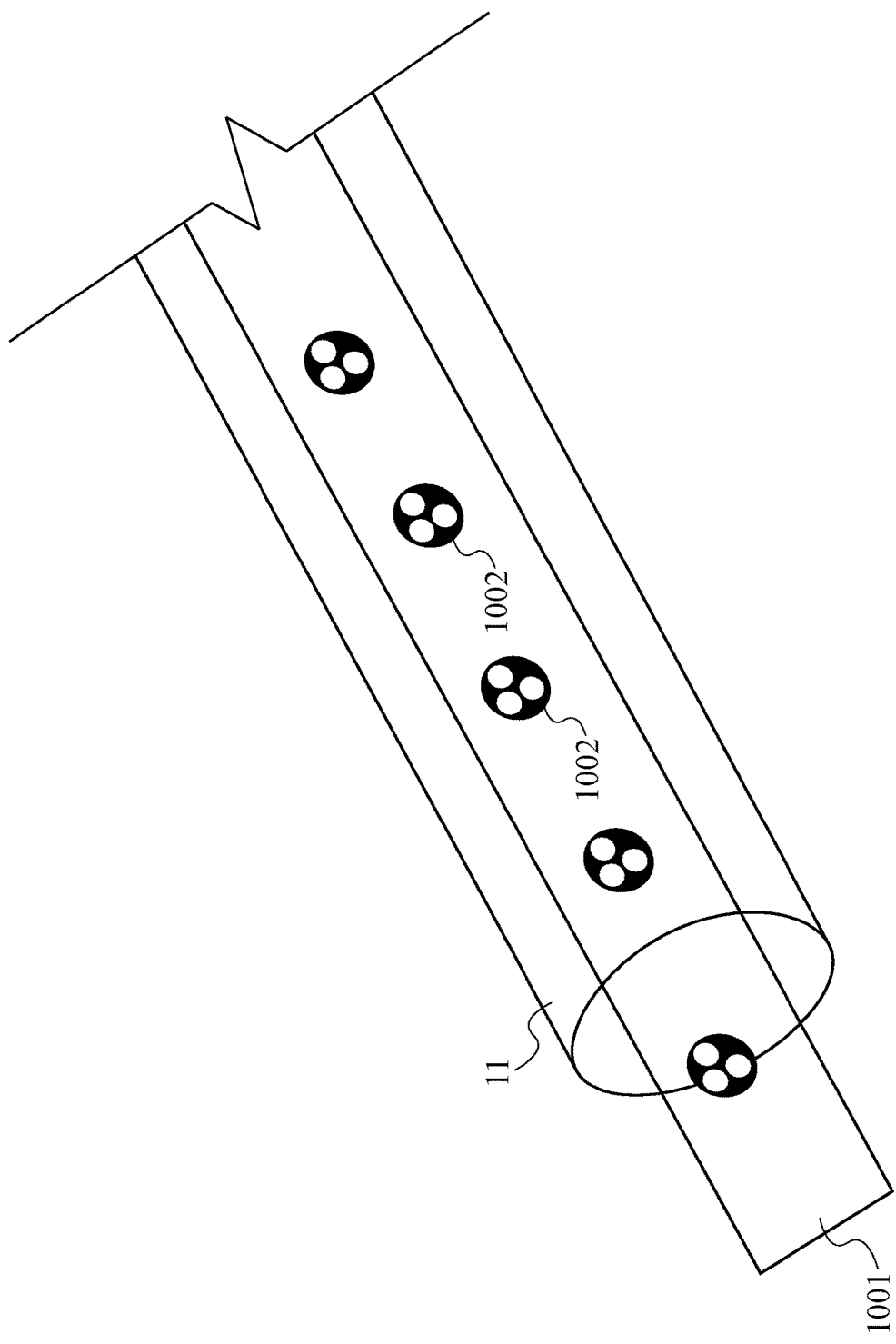
FIG. 9 is a schematic diagram of the string of LEDs being housed within a sleeve.

As can be seen in FIG. 9, the present invention may comprise at least one sleeve 11, which is further used to visually enhance the string of LEDs 10. Thus, the string of LEDs 10 is positioned with the sleeve 11 so that the entire length of the string of LEDs 10 is enclosed by the sleeve 11. The sleeve 11 can be, but is not limited to, transparent, translucent, colored, or combinations thereof. More specifically, wires positioned internally within the upper 2 or boot shaft of the final injected product may be contained within a sleeve 11, which is separate from any wire insulation. The sleeve 11 may be clear, of a color, or a combination thereof and may themselves represent a complex graphic 3. A clear sleeve 11 may be used for containing a decorative wire 1001 which contains surface mounted LEDs along its length. When using a decorative wire 1001 with such LEDs, two-way tape may be applied to the decorative wire 1001 or the back side of the sleeve 11 so that the decorative wire 1001 may be properly applied to the contours of the last 14, which may first be covered with a sock liner 4. Though a form of two-way tape is preferred, any suitable means may be used so to attach the decorative wire 1001 within the sleeve 11 to the last 14 or the sock liner 4, which is first applied to the last 14 in order to ensure the sleeve 11 and the decorative wire 1001 will be internalized within the upper 2 of the final injected product. A sleeve 11 of a solid color may be used so to house and contain round wires, which may contain LEDs at the end of those wires. For example, if three LEDs were being positioned on a boot shaft, then this would require as many as six round wires. In the case of six wires, a manufacturer may elect to contain two wires in each of three sleeves.

Though the sleeve 11 may be of any color, the manufacturer could elect to use a matching color to that of the sock liner 4, if any, which would best conceal the decorative wire 1001 and the sleeve 11 from view. A sleeve 11, which may be a combination of color and clear, may be used and attached as described earlier. However, the color and clear combination of the sleeve 11 will work in two manners. The color portion of the sleeve 11 may match the sock liner 4 while the clear portion is provided in consideration of the LEDs so that a surface mounted LED can emit unobscured light through the clear portion. No matter how a sleeve 11 or combination of sleeves 11 are used for the decorative wire 1001, such as matching a sock liner 4 or introducing a color contrasting the sock liner 4 or the complex graphic 3, the sleeve 11 allows for a faster and more efficient containment of the decorative wire 1001 prior to the injection molding process and ensures proper internalization within the upper 2 or boot shaft of the final injected product. In the case of an LED being attached to the end of the decorative wire 1001, the LED itself, which is separate from the sleeve 11, may also be attached to the sock liner 4 or directly attached to the last 14, which may include a separately attached light diffuser and or other components as desired by the manufacturer.

Figure 10:
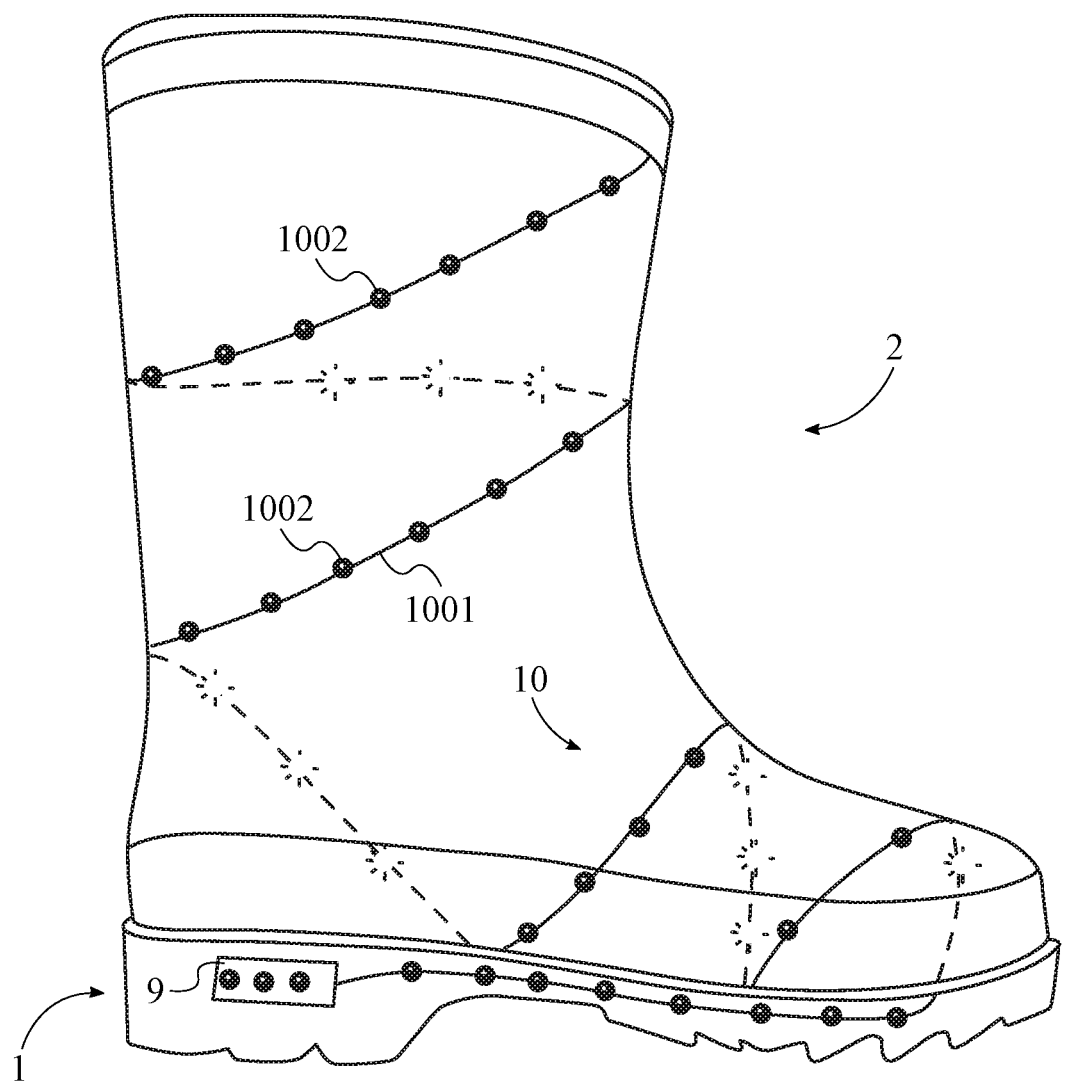
FIG. 10 is a side view of the present invention, wherein the present invention is using a string of LEDs following a decorative path from the LED device, all around the present invention, and back to the complex graphic.

As can be seen in FIG. 10, another embodiment relying upon an LED device 9 with decorative or flat wires and with LED lights installed along the wire's length is the position and transition of the wire and LED light sources from within the outsole 103, up and into the upper 2 and/or boot shaft of the injected footwear. An LED device 9, positioned within the outsole 103 and/or midsole 102 at the heel area, may contain one or more LED lights internally within the LED device 9 itself. Connected to and extending from the LED device 9 are wire(s) that typically are decorative or flat wiring, which contain a series of LED light sources along the length of that wire(s). With the LED device 9 typically located within the heel area of the outsole 103, the wiring with LED light sources may extend from the LED device 9 towards the toe, up and over the toe, wrapping back under the sole 1, over the vamp or mid-foot area of the upper 2, once more under the sole 1, and up and around the boot shaft. In other words, the manufacturer may freely apply the string of LEDs 10 much like hanging a string of decorative Christmas lights, all of which are internal to the outsole 103, toe, upper 2, mid-foot, and/or boot shaft of the final injected product resulting in the entire outsole 103, upper 2, and/or boot shaft being internally illuminated. Additionally, a translucent or generally opaque PVC could be used in order to hide or partially hide any evidence of the light string and or LED light sources, while still permitting light to pass through the PVC and observed by a person viewing the present invention.

Figure 11:
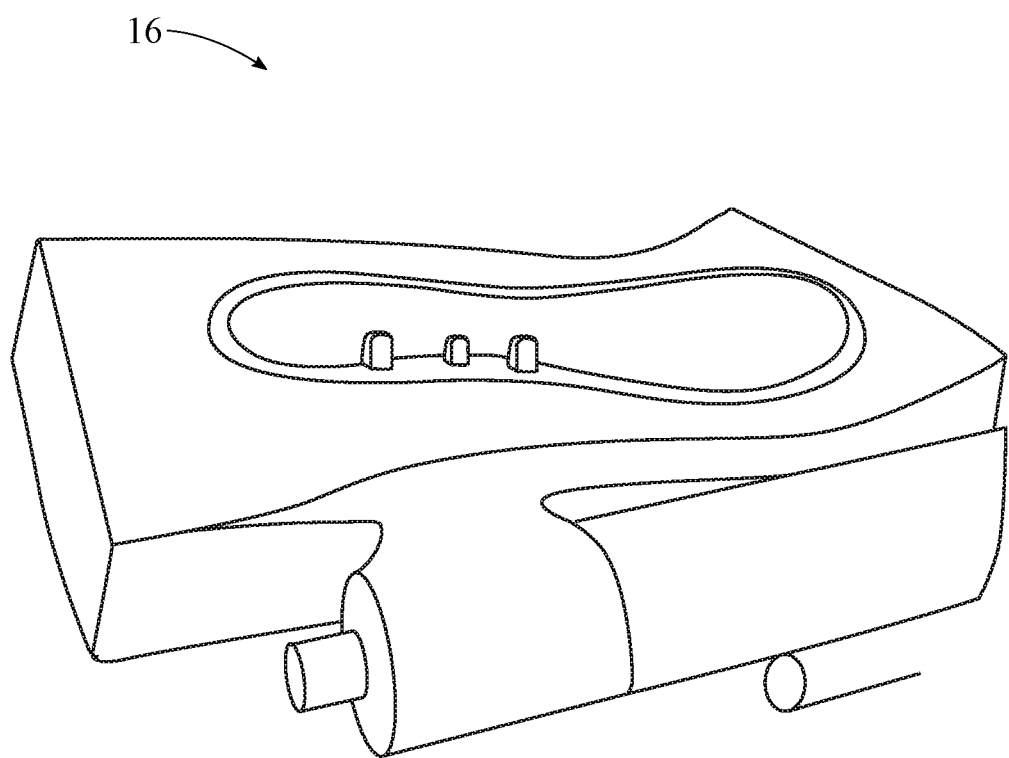
FIG. 11 is an illustration of one of the mold components that is used generate the extrusions for the satellite LED.
Figure 12:
FIG. 12 is an illustration of the present invention with at least one cavity traversing into the upper.
Figure 13:
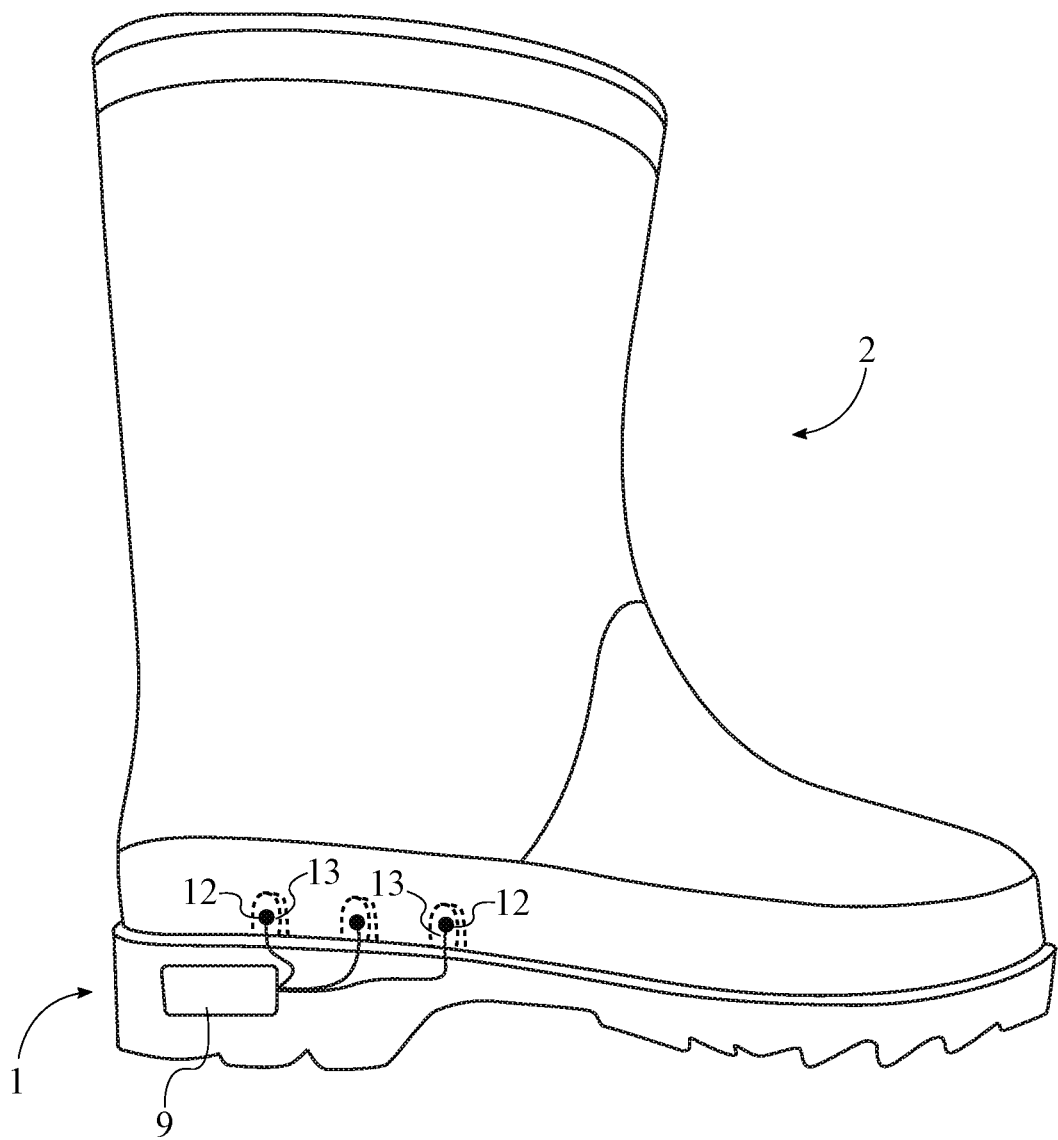
FIG. 13 is an illustration of the present invention with at least one cavity being integrated between the upper and the sole, which houses at least one satellite LED for the present invention.

As can been seen in FIGS. 11 and 13, the present invention may be further configured to illuminate specified areas of the injected footwear. Thus, the present invention may further comprise at least one LED device 9, at least one satellite LED 12, and at least one cavity 13. The LED device 9 and the satellite LED 12 are illumination devices with a low power consumption. Similarly, the LED device 9 is connected into the sole 1, which allows the light from the LED device 9 to radiate throughout the sole 1 and the upper 2. The cavity 13 is integrated into the upper 2 and is positioned adjacent to the sole 1, which places the cavity 13 at the intersection of the upper 2 and the sole 1. The satellite LED 12 is used to remotely illuminate a specified area of the injected footwear that is positioned away from the LED device 9. The satellite LED 12 is mounted within the cavity 13 in order to illuminate the upper 2 and the sole 1 from the positioning of the cavity 13. The satellite LED 12 is also electrically connected to the LED device 9 so that the satellite LED 12 is powered by the LED device 9 and is functionally coordinated with the LED device 9.

More specifically, LEDs are positioned within the base 17 of the upper 2 or boot shaft. The mold component 16, which forms the insole 101 and portion of the midsole 102, may contain at least one extrusion to configure the cavity 13 within the base 17 of an upper 2 or boot shaft, which may be positioned in the heel area just above the outsole 103. This cavity 13 would be formed during the first injection process and intended to house the installation of the satellite LED 12. As can be seen in FIG. 11, with the first injection process complete, the mold component 16 which forms the insole 101 and portion of the midsole 102 is opened so that its extrusion is removed from the cavity 13. The satellite LED 12 is then installed within the cavity 13, while the LED device 9 which contains the integrated circuit, battery(s), and etc. is positioned atop the underside of the insole 101, which is the midsole 102/partially-formed-midsole 102, typically in the heel area. The LED device 9 may be attached or secured to the midsole 102/partially-formed-midsole 102 by any suitable means or by way of a housing which may be configured during the first injection process. With satellite LED 12 installed within the cavity 13 and the LED device 9 secured onto the midsole 102/partially-formed-midsole 102, the second injection process forms any balance of the midsole 102, the outsole 103, and an optional tread pattern, while internalizing the LED device 9.

When the LED device 9 is activated, light is projected up and through the upper 2 or boot shaft, thus internally illuminating the upper 2 and boot shaft. When combined with the complex graphics 3, the sock liner 4, glitter, Mica, or combinations thereof, the LED device 9 that is internally positioned within the base 17 of the upper 2 or boot shaft and combined with such elements will result in reflection and refraction of light, which generates additional aspects of interest for the observer. Non-glitter or non-mica elements that may be spherical and with melt temperatures higher than that of PVC or other injectable molding materials used in the production of injected footwear products, no matter if translucent, opaque, or reflective, may be added to PVC in the making of injected footwear. When combined with light projected up and through the upper 2, or boot shaft, thus internally illuminating the upper 2 and boot shaft, spherical elements may generate the effect of illuminated bubbles. Additionally, the complex graphic 3 may be positioned at a slightly downward facing angle so that the front surface of the complex graphic 3 may be exposed to additional light for a more enhanced visual effect. Additionally, the base 17 of the upper 2 or boot shaft just above the outsole 103, which contains the cavity 13 and houses the satellite LED 12, may need to be increased in thickness in order to accommodate the cavity 13 and satellite LED 12.

Figure 14A:
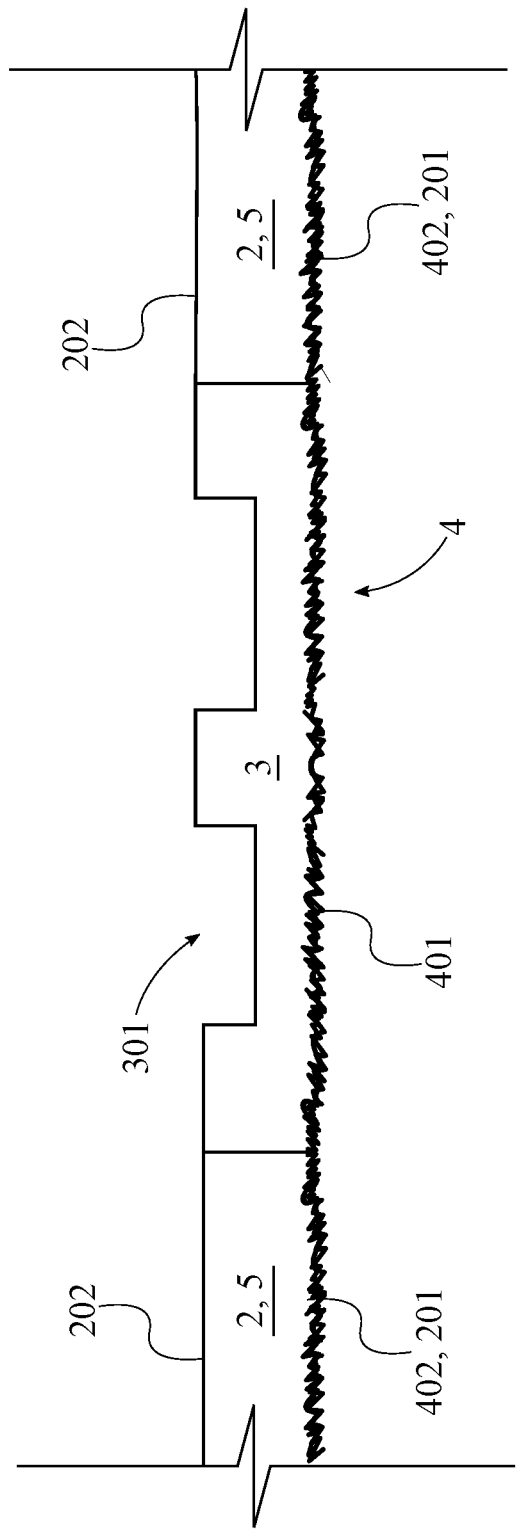
FIG. 14A is an illustration of the present invention with a fully exposed complex graphic through the upper.
Figure 14B:
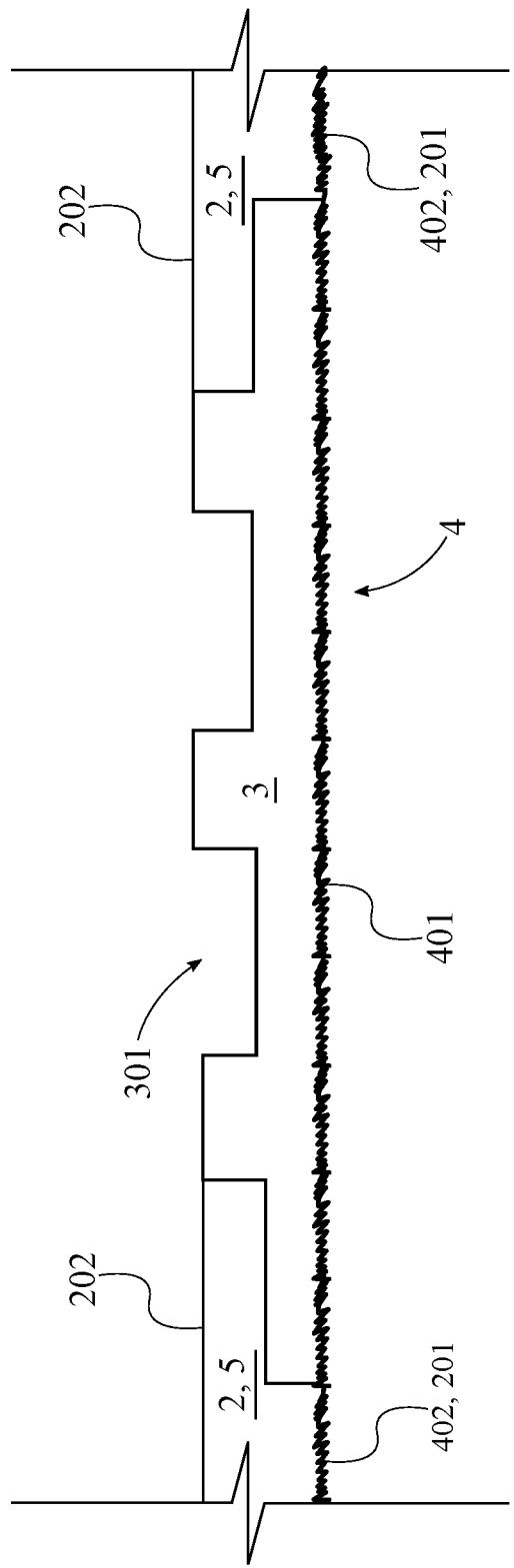
FIG. 14B is an illustration of the present invention with a partially exposed complex graphic through the upper.

As can be seen in FIGS. 14A and 14B, the present invention may be configured to display the complex graphic 3 with a more three-dimensional perception. Thus, the complex graphic 3 traverses from the interior surface 201 to the exterior surface 202 so that an exposed portion 301 of the complex graphic 3 is positioned coincident with the exterior surface 202. This allows the complex graphic 3 to become a discernable contour in the overall exterior shape of the injected footwear. More specifically, a complex graphic 3 with a three-dimensional form, which is attached to the sock liner 4 or is directly attached to the last 14, may be both partially internalized and partially exposed along the exterior surface 202 of the final injected product. In this embodiment, the complex graphic 3 is preferably made of a molded, rubber type material such as thermoplastic rubber (TPR), PVC, or made of a material which will withstand the wear and tear of the normal footwear. In order to achieve this three-dimensional look for the complex graphic 3, the borders and/or other raised areas of the complex graphic 3 must measure a thickness that is slightly thicker than the void created by the last 14 and the mold component 16 where the complex graphic 3 is to be located. Once the complex graphic 3 is attached to the sock liner 4, the mold components 16 are closed encapsulating the last 14. Once the mold is closed around the last 14, those raised areas of the complex graphic 3 measuring a thickness greater than the void between the last 14 and the mold components 16 must create a seal capable of withstanding the pressures of the injection molding process. With a proper seal created between the complex graphic 3 and the mold, areas of the complex graphic 3 creating the seal(s) and areas protected by the seal(s) which are of a lower elevation than that of the seal(s) are protected from being internalized, while the balance of the complex graphic 3 is internalized. The result is the complex graphic 3 being partially internalized, whereby portions of the complex graphic 3 are exposed along the exterior surface 202 of the final injected product.

Figure 15:
FIG. 15 is an illustration of the present invention with the complex graphic as a translucent component.

As can be seen in FIG. 15, the present invention may also configure the complex graphic 3 to be an optical element that is used in conjunction with the LED device 9 in order to generate a different kind of aesthetically pleasing appearance for the injected footwear. Thus, the present invention may further comprise at least one LED device 9, which is an illumination device with a low power consumption, while the complex graphic 3 is translucent. Similarly, the LED device 9 is connected into the sole 1, which allows the light from the LED device 9 to radiate throughout the sole 1 and the upper 2. In addition, the LED device 9 is in optical communication with the complex graphic 3 so that the light from the LED device 9 is primarily radiated through the complex graphic 3 and is secondarily radiated through the sole 1 and the upper 2. More specifically, the internal complex graphic 3 may be a translucent component. The translucent component is attached to the sock liner 4 or is directly connected to the last 14 and connected to at least one light source. The translucent component itself may be configured to form an abstract design, flower, or etc. When the LED device 9 is activated, the translucent component is internally illuminated.

Moreover, the translucent component may comprise boundary areas for refracting light, whereby a boundary area comprises a plurality of cavities, whereby the plurality of cavities may be filled with a boundary material or left empty. When the LED device 9 is activated, the translucent component is internally illuminated, whereby light enters the boundary section of the translucent component and is refracted by the plurality of cavities. The light, which is refracted by the plurality of cavities, appears as brighter points of light than the internally illuminated translucent component.

Further, as can be seen in FIG. 4C, a quantity of granular reflective material 6 (e.g. glitter or metallic flakes such as mica particulate) is heterogeneously mixed into the injectable molding material 5 in order to add an internal aesthetically pleasing element to the injected footwear.) The quantity of granular reflective material 6 can be added either translucent or clear PVC while adding an element of fashion and glitz. More specifically, the natural earth mineral Mica, commonly used in facial makeup, lipstick, and alike, may be applied directly to the sock liner 4 and/or as an additive to the PVC used in the manufacture of the injected footwear. Mica is available in numerous colors and may be processed into an extremely fine powders as well as any heavier coarseness that may be desired. Mica may be directly applied to the sock liner 4 of the injected product in order to add more fashion interest as well as reflection and refraction when combined with the LED device 9. If Mica is used as an additive to PVC in the production of injected footwear, a more-coarse cut of Mica can add brilliant colors while interacting with both internal and externa light sources. Alternatively, when Mica is used as an additive to PVC, Mica in the form of a very fine power will create a pearlized finish adding luster to the injected product.

Supplemental Description

As it is understood in the art, a shank or steel shank may be applied to an insole 101, in order to provide structural integrity to the footwear, specifically that area of the sole 1 from the heel forward, through the length of the arch. A separate use and meaning for the term shank, is when a person skilled in the art refers to the arch side of the footwear as the shank. When a person skilled in the art refers to the shank in this context, they are referring to that side of the footwear which contains the arch, as opposed to the arch itself, in which case one skilled in the art would reference the arch, whereby they would then typically be referring to the arch which is interior to the footwear, but also applies to the outside or upper area where the arch is located.

The embodiments discussed herein may be applied to any and all types of injected footwear no matter if a sandal, shoe, boot or injected footwear component which may then be utilized and attached to an otherwise non-injected footwear. Therefore, it is understood that sandals, shoes and boots have uppers which are suitable for the various embodiments as discussed in these specifications, and that a boot shaft as it applies to these specifications, is no less the upper of the boot than the lower areas of the boot's upper.

Although the invention has been explained in relation to its preferred embodiment, it is to be understood that many other possible modifications and variations can be made without departing from the spirit and scope of the invention as hereinafter claimed.

What is claimed is:

1. An injected footwear with an internal complex graphic comprises:
   a sole;
   an upper comprising an interior surface and an exterior surface; and
   a sock liner comprising a proximal liner portion that forms a portion of the interior surface, and a surrounding liner portion positioned near the interior surface between the exterior surface and the interior surface;
   with, the upper being connected onto the sole;

with, the internal complex graphic being attached to, separate from, overlaying, and extending away from the surface of the sock liner at the proximal liner portion; and, with, the upper comprising an injectable molding material extending from the exterior surface to the graphic at the proximal liner portion with the graphic blocking the injectable molding material from impregnating the proximal liner portion such that the interior surface, which interfaces with a wearer's foot, comprises unimpregnated sock liner at the proximal liner portion, and with the injectable molding material further extending from the exterior surface to the sock liner to traverse into and penetrate the sock liner at the surrounding liner portion such that the interior surface comprises impregnated sock liner impregnated with injectable molding material at the surrounding liner portion.

2. The injected footwear with internal complex graphic as claimed in claim 1, wherein the injectable molding material is polyvinyl chloride (PVC).

3. The injected footwear with internal complex graphic as claimed in claim 1, wherein a transparency property of the injectable molding material is selected from a group consisting of: clear, translucent, partially-opaque, and opaque.

4. The injected footwear with internal complex graphic as claimed in claim 1 wherein the sole comprises an insole, midsole and outsole:
wherein the upper, the insole, and the midsole being made of a first-step portion of the injectable molding material; and
the outsole being made of a second-step portion of the injectable molding material.

5. The injected footwear with internal complex graphic as claimed in claim 1 comprises:
the sock liner being made of a low thread count fabric; and
the injectable molding material traversing into an interspacing of the low thread count fabric.

6. The injected footwear with internal complex graphic as claimed in claim 1 comprises:
a quantity of granular reflective material; and
the quantity of granular reflective material being heterogeneously mixed into the injectable molding material.

7. The injected footwear with internal complex graphic as claimed in claim 6, wherein the quantity of granular reflective material is mica particulate.

8. The injected footwear with internal complex graphic as claimed in claim 1 comprises:
at least one vinyl patch;
at least one printed graphic;
the vinyl patch comprises a first patch face and a second patch face;
the printed graphic being inscribed onto the first patch face;
the first patch face being oriented away from the exterior surface;
the second patch face being oriented towards the exterior surface; and
the vinyl patch being connected onto the exterior surface.

9. The injected footwear with internal complex graphic as claimed in claim 1 comprises:
the upper further comprising a receiving portion and a remainder portion;
the complex graphic traversing into the receiving portion from the interior surface;
a peripheral boundary of the receiving portion being positioned around a peripheral boundary of the complex graphic; and
a thickness of the receiving portion being greater than a thickness of the remainder portion.

10. The injected footwear with internal complex graphic as claimed in claim 1 comprises:
the upper further comprising a first lateral portion and a second lateral portion;
the first lateral portion and the second lateral portion being positioned opposite to each other about the upper;
the complex graphic traversing into the first lateral portion from the interior surface; and
a thickness of the first lateral portion being greater than a thickness of the second lateral portion.

11. The injected footwear with internal complex graphic as claimed in claim 1 comprises:
at least one light emitting diode (LED) device;
the LED device being connected into the upper; and
the LED device being configured to illuminate the complex graphic.

12. The injected footwear with internal complex graphic as claimed in claim 1 comprises:
at least one LED device;
at least one string of LEDs;
the LED device being connected into the sole;
the string of LEDs being connected into the sole and the upper;
the string of LEDs traversing out of the LED device;
the string of LEDs being positioned in between the upper and the sock liner; and
the string of LEDs being electrically connected to the LED device.

13. The injected footwear with internal complex graphic as claimed in claim 12 comprises:
the string of LEDs comprises a decorative wire and a plurality of LEDs;
the plurality of LEDs being positioned along the decorative wire; and
the plurality of LEDs being electrically connected to the decorative wire.

14. The injected footwear with internal complex graphic as claimed in claim 13 comprises:
the string of LEDs traversing from the sole, about the upper, and to the complex graphic.

15. The injected footwear with internal complex graphic as claimed in claim 12 comprises:
at least one sleeve;
the string of LEDs being positioned within the sleeve; and
the sleeve being selected from a group consisting of: transparent, translucent, colored, or combinations thereof.

16. The injected footwear with internal complex graphic as claimed in claim 1 comprises:
at least one LED device;
at least one satellite LED;
at least one cavity;
the LED device being connected into the sole;
the cavity being integrated into the upper;
the cavity being positioned adjacent to the insole;
the satellite LED being mounted within the cavity; and
the satellite LED being electrically connected to the LED device.

17. The injected footwear with internal complex graphic as claimed in claim 1 comprises:

the complex graphic traversing from the interior surface to the exterior surface; and an exposed portion of the complex graphic being positioned coincident with the exterior surface.

18. The injected footwear with internal complex graphic as claimed in claim 1 comprises:
at least one LED device;
the complex graphic being translucent;
the LED device being connected into the sole; and
the LED device being in optical communication with the complex graphic.

19. An injected footwear with an internal complex graphic comprising:
a sole;
an upper; and,
an at least one internal complex graphic;
with, the upper comprising a low thread count fabric sock liner, a proximal liner portion, the internal complex graphic positioned adjacent the proximal liner portion, a surrounding liner portion positioned around the proximal liner portion, and an interior surface of the footwear for receiving a wearer's foot, whereby the injectable molding material is bonded into the surrounding liner portion, allowing the surrounding liner portion of sock liner not to be attached to the internal complex graphic, whereby the surrounding liner portion is connected onto the interior surface and insole, whereby the injectable molding material traverses into the fabric sock liner's interspacing low thread count allowing the injectable molding material to securely bond with the interior surface of the upper and insole; whereby the internal complex graphic is connected in between the upper and the proximal liner portion, whereby the injectable molding material internalizes the internal complex graphic between the sock liner and the exterior surface of the upper; the internal complex graphic comprising internally the entirety of an LED component, padding eliminating empty voids within the internal complex graphic, a backing, and a translucent front surface component containing translucent graphical art, whereby upon activation of the LED component light passes through the translucent front surface component and translucent graphical art resulting in the internal complex graphic, being internally illuminated.

* * * * *